US012791135B2

(12) United States Patent
Khajehgani

(10) Patent No.: US 12,791,135 B2
(45) Date of Patent: Nov. 10, 2026

(54) FLUID DISTRIBUTOR UNIT AND METHOD FOR ADAPTING A FLOW DISTRIBUTOR UNIT

(71) Applicant: Kongsberg Automotive Holding 2 AS, Kongsberg (NO)

(72) Inventor: Ali Khajehgani, Hunndalen (NO)

(73) Assignee: KONGSBERG AUTOMOTIVE HOLDING 2 AS, Kongsberg (NO)

( * ) Notice: Subject to any disclaimer, the term of this patent is extended or adjusted under 35 U.S.C. 154(b) by 17 days.

(21) Appl. No.: 19/042,536

(22) Filed: Jan. 31, 2025

(65) Prior Publication Data

US 2025/0271088 A1 Aug. 28, 2025

(30) Foreign Application Priority Data

Feb. 22, 2024 (EP) .................................... 24159173

(51) Int. Cl.
*F16L 41/03* (2006.01)
*F16L 55/11* (2006.01)

(52) U.S. Cl.
CPC .............. *F16L 41/03* (2013.01); *F16L 55/11* (2013.01)

(58) Field of Classification Search
CPC .............. F16L 41/03; F16L 55/11; F15D 1/14
See application file for complete search history.

(56) References Cited

U.S. PATENT DOCUMENTS 742,409 A * 10/1903 Gallaher ................. F16L 27/12 285/133.11
2,327,449 A * 8/1943 Parker ................... F16L 41/005 138/37
6,497,250 B1 12/2002 Johann
6,595,556 B1 7/2003 Zenko et al.
10,267,515 B2 * 4/2019 Adriany ................. F23D 14/22
10,465,829 B2 11/2019 Doig
(Continued)

FOREIGN PATENT DOCUMENTS

CN 201787244 U 4/2011
EP 0523549 A2 1/1993
(Continued)

OTHER PUBLICATIONS

European Application No. 24159173.4 filed Feb. 22, 2024; Extended European Search Report dated Jul. 1, 2024; 8 pages.

*Primary Examiner* — Michael R Reid
(74) *Attorney, Agent, or Firm* — CANTOR COLBURN LLP

(57) ABSTRACT

A fluid distributor unit includes a flow conduit which surrounds a connecting passage extending in a longitudinal direction therethrough, a releasable plug, and a releasable locking element. The fluid conduit comprises at least three ports in fluid communication with the connecting passage. At least two of the ports extend transversely to the connecting passage from the flow conduit. The flow conduit is open at one end of the connecting passage in the longitudinal direction so that the one end of the connecting passage forms an opening in the flow conduit. The releasable plug is inserted into the opening of the flow conduit to close the opening. The releasable plug has an inner surface with a smooth flow directing surface shape which at least partially projects into the connecting passage to direct fluid flow with reduced turbulence.

19 Claims, 10 Drawing Sheets

(56) References Cited

U.S. PATENT DOCUMENTS

| | | | | |
|---|---|---|---|---|
| 2006/0054222 | A1 | 3/2006 | Goinski | |
| 2008/0078464 | A1* | 4/2008 | Loewe | F16L 37/0847 138/109 |
| 2008/0105311 | A1 | 5/2008 | Bulter | |
| 2018/0078464 | A1* | 3/2018 | Sanchez | A61J 17/1011 |
| 2020/0362981 | A1 | 11/2020 | Grether et al. | |
| 2020/0370696 | A1 | 11/2020 | Zhang | |
| 2022/0074529 | A1 | 3/2022 | Que | |
| 2022/0176420 | A1 | 6/2022 | Lovell et al. | |

FOREIGN PATENT DOCUMENTS

| | | | |
|---|---|---|---|
| EP | 3557108 | A1 | 10/2019 |
| WO | 2011117822 | A1 | 9/2011 |

* cited by examiner

FLUID DISTRIBUTOR UNIT AND METHOD FOR ADAPTING A FLOW DISTRIBUTOR UNIT

CROSS-REFERENCE TO RELATED APPLICATIONS

This application claims the benefit of European Patent Application Serial No. 24159173.4 filed Feb. 22, 2024, the disclosure of which is incorporated herein by reference in its entirety.

BACKGROUND

The present invention relates generally to a fluid distributor unit.

SUMMARY

The present disclosure relates to a fluid distributor unit comprising a flow conduit which surrounds a connecting passage extending in a longitudinal direction therethrough, and which is provided with at least three ports in fluid communication with the connecting passage (which provides fluid flow connection between the ports), wherein at least two of the ports extend transversely to the connecting passage from the flow conduit. The present disclosure further relates to a method for adapting the flow distributor unit to a given type of fluid and to a predetermined pattern of flow rates through the ports of the fluid distributor unit.

A fluid distributor unit is for example disclosed in US 2008/0105311 A1. The fluid distributor unit has a flow conduit with an input port and two output ports extending transversely from the flow conduit of the flow distributor unit.

Fluid distributor units are typically used in vehicle systems which use fluid flow systems for cooling purposes, or more generally for thermal management purposes, or as hydraulic or pneumatic fluid flow systems in battery electric vehicles or internal combustion vehicles.

A typical fluid distributor comprises for example a flow conduit with two input ports to be connected to two tubes delivering incoming fluid, and two output ports to be connected to two tubes for passing on the fluid flows.

Currently available fluid flow distributors generate high pressure drop values for the fluid flow through the fluid distributor unit because of sudden directional changes of fluid flow and turbulences created at sharp edges in the interior flow passages through the flow distributor unit. This is on the one hand disadvantageous because a high pressure drop in the fluid distributor units of a fluid distribution system requires more energy input to increase the input pressure to make up for pressure losses in the flow distributor units. A further disadvantage is that high pressure drops in the flow distributor units are accompanied by high forces acting on parts of the flow distributor unit which increase requirements for sufficient structural integrity and mechanical strength of the parts of the flow distributor unit.

One or more embodiments of the present disclosure provides a fluid distributor unit which is capable of influencing the pressure drop created in the flow distributor unit to reduce pressure drop and to improve fluid flow efficiency through the fluid distributor unit. One or more embodiments of the present disclosure provides a method for adapting such a fluid flow distributor to a given fluid flow situation to be handled, wherein the fluid flow situation is determined by a given type of fluid and by a predetermined pattern of flow rates through the ports of the flow distributor unit, wherein the type of fluid determines its viscosity and the pattern of flow rates determines flow conditions and resulting pressure drop in the flow distributor unit. One or more embodiments of the present disclosure provides a fluid distribution kit including a fluid distributor unit and a set of exchange releasable plugs.

According to one or more embodiments of the present disclosure, the fluid distributor unit comprises a flow conduit which surrounds a connecting passage extending in a longitudinal direction therethrough. The flow conduit is provided with at least three ports in fluid communication with the connecting passage, at least two of the ports extending transversely to the connecting passage from the flow conduit. According to one or more embodiments of the present disclosure, the flow conduit is, at one end of the connecting passage in its longitudinal direction, open, so that the end of the connecting passage forms an opening in the flow conduit. A releasable plug is inserted into the opening of the flow conduit to close the opening, wherein the releasable plug is provided at its inner surface with a smooth flow directing surface shape which is at least partially projecting into the connecting passage to direct fluid flow with reduced turbulence. A releasable locking element is configured to engage with and to extend through aligned holes in the releasable plug and in the flow conduit to thereby hold the releasable plug locked in place in the opening of the flow conduit.

The fluid distributor unit according to one or more embodiments of the present disclosure provides a flow distributor unit with improved flow efficiency and reduced pressure drop by placing a smooth flow directing surface shape which at least partially projects into the connecting passage into the fluid flow through the connecting passage which avoids, due to its smooth surface shape, sharp edges and therefore reduces the pressure drop of the fluid flow through the fluid distributor unit. Placement of the smooth flow directing surface shape in the connecting passage by insertion of the releasable plug into the opening of the flow conduit allows to provide inner surface features in the connecting passage of the flow conduit which were otherwise impossible or difficult to realize inside the connecting passage of the flow conduit with convention production methods for the flow conduit.

Furthermore, the opening in the flow conduit allows access to the interior of the flow conduit and this allows, in case the flow conduit is formed by injection molding, to place additional molding tools in the interior of the flow conduit, which additional molding tools permit to form smoothly curved inner walls and to avoid sharp edges in the connecting passage of the flow conduit, thereby reducing turbulence and pressure drop. But also for flow conduits that are not formed by injection molding, the access to the interior of the flow conduit provided by the opening allows to improve interior wall areas of the flow conduit by mechanical surface treatment and finishing to achieve smooth curves to support laminar flow and reduce pressure drop.

According to one or more embodiments, the releasable plug is cup-shaped with its outer surface opposite to its inner surface comprising a recess including an upstanding outer rim which has an outer diameter equal to an inner diameter of the connecting passage of the flow conduit and which comprises two diametrically opposite holes. The flow conduit comprises close to the opening two diametrically opposite holes in its outer wall which are located such that they can be aligned with the holes of the outer rim of the releasable plug when the releasable plug is in the inserted position in the opening of the flow conduit. In this manner the locking element can be inserted to extend through the aligned holes and along the recess of the releasable plug, thereby holding the releasable plug locked in place in the opening of the flow conduit.

According to one or more embodiments of the present disclosure, the releasable plug permits access to the interior of the connecting passage of the flow conduit for inspection and cleaning purposes.

According to one or more embodiments, the outer rim of the cup-shaped releasable plug comprises at least one outwardly extending tongue. The opening of the flow conduit is provided with at least one complementary recess to receive the at least one tongue of the releasable plug when the releasable plug is rotationally positioned in the opening of the flow conduit with the holes of the outer rim of the releasable plug aligned with the holes in the outer wall of the flow conduit. The tongue and complementary recess assist in the positioning of the releasable plug in the correct rotational orientation and furthermore lock the releasable plug against rotational movements in the opening of the flow conduit. According to one or more embodiments, the outer rim of the releasable plug comprises two outwardly extending tongues, and the opening of the flow conduit comprises two complementary recesses to receive the tongues of the releasable plug when the releasable plug is rotationally positioned in the opening of the flow conduit with the holes of the outer rim of the releasable plug aligned with the holes in the outer wall of the flow conduit, optionally wherein the two tongues are located diametrically opposite to each other and the two complementary recesses are located diametrically opposite to each other.

According to one or more embodiments, the releasable locking element comprises an elongated bar which carries on opposite sides thereof two locking arms which are connected to the elongated bar at connection regions on opposite sides of the elongated bar. Each locking arm has a self-supporting end portion extending from the connection region towards one end of the elongated bar (towards the end but not reaching the distance to the end, so that an end portion of the elongated bar extends beyond the locking arms). The self-supporting end portion of each locking arm is flexible and can be flexed from a rest position to an inwardly bent position closer to the elongated bar. The dimensions of the holes in the outer rim of the releasable plug and in the outer wall of the flow conduit and the dimensions of the locking element are configured such that the locking element can, with the self-supporting end portions of the locking arm urged to the inwardly bent position, be advanced through the holes of the outer rim and the outer wall of the flow conduit to move the locking element out of engagement with the releasable plug and the flow conduit to unlock the releasable plug. On the other hand, when the locking arms are in the rest position, the self-supporting end portions extend outwardly beyond the holes in the releasable plug such that the end portions of the locking arms are in abutment on an inner wall of the outer rim of the releasable plug, whereby the locking element is caped fixed in the locking position with the elongated bar extending through the opposite aligned holes in the outer rim of the releasable plug and of the outer wall of the flow conduit. If each of the locking arms comprises only one self-supporting end portion, and both locking arms point with its self-supporting end portion towards one of the ends of the locking bar, this locking element can only be removed in the direction the self-supporting end portions are directed, and can be inserted only in the opposite direction.

According to one or more embodiments, each locking arm extends with two self-supporting end portions in a symmetrical manner from a central connection region of the elongated bar in opposite direction towards the two opposite ends of the elongated bar (but, as noted above, not extending the total distance to the ends of the elongated bar). In this manner a user can squeeze the self-supporting end portions of the two locking arms towards the elongated bar to the inwardly bent position, whereby the ends of the two locking arms are no longer facing the inner wall of the outer rim of the cup-shaped releasable plug, but face the aligned openings in the outer rim of the plug and the outer wall of the flow conduit which permits that the user advances the locking element by pushing it through the aligned openings and out of engagement with the aligned holes, thereby unlocking the releasable plug which can then be removed from the openings of the flow conduit. In other words, the connection regions of the locking arms are located, in the direction of elongation of the elongated bar, at a central region of the elongated bar, and each locking arm comprises two self-supporting end portions extending from the central connection region towards opposite ends of the elongated bar such that the locking element can be removed from the locking position in fixed engagement in the releasable plug by squeezing the locking arms extending towards at either of the two opposite ends of the locking element together to the inwardly bent position to the allow to advance the locking element in the direction of the inwardly bent locking arm through the aligned holes of the releasable plug and of the outer wall of the flow conduit so that the locking element can be removed in either one of the two opposite directions from the locking position in the locked state in the releasable plug.

According to one or more embodiments, the elongated bar and the locking arms of the locking element are integrally formed in one piece, optionally wherein the locking element is made of a plastic material. In an alternative embodiment the elongated bar and the locking arms of the locking element are formed from different materials and the locking arms are connected to the elongated bar, optionally wherein the locking element is made of a plastic material and the locking arms are made of metal.

According to one or more embodiments, the releasable plug comprises a throughgoing aperture extending from its outer surface to its inner surface. The fluid distributor unit is further provided with a sensor having a tip portion, wherein the aperture of the releasable plug is configured to receive the tip portion of the sensor such that a sensitive inner end of the tip portion, when the sensor is attached to the releasable plug, is exposed to the fluid flowing through the flow distributor unit.

According to one or more embodiments, the flow conduit of the fluid distributor unit comprises a second opening to the connecting passage, a second releasable plug is inserted into the second opening and is held locked in place by a second locking element, thereby exposing the smooth flow directing surface shape of the second releasable plug to the fluid flow through the flow distributor unit.

According to one or more embodiments, the upstanding outer rim of the releasable plug comprises at its outer wall a circumferential groove in which a sealing ring is received.

According to one or more embodiments, a method for adapting a fluid distributor unit to a given type of fluid and to a predetermined pattern of flow rates through the ports of the fluid distributor unit. According to one or more embodiments of the present disclosure, the method includes the steps of: providing an adapted releasable plug with a flow directing surface shape adapted to the given type of fluid and the predetermined pattern of flow rates in terms of causing a minimal pressure drop in the flow distributor unit, and inserting the adapted releasable plug into the opening of the flow conduit and bringing the locking element to the locking position holding the adapted releasable plug in place in the opening of the fluid flow conduit. In this manner the flow distributor unit can be adapted to the particular situation in which the adapted through distributor unit is to be utilized.

According to one or more embodiments, the step of providing an adapted releasable plug includes: simulating the flow through the fluid distributor unit for the given type of fluid and the predetermined pattern of flow rates; varying the flow directing surface shape of the releasable plug; repeating the flow simulation to determine an optimized flow directing surface shape which minimizes the pressure drop in the fluid distributor unit; and forming an adapted releasable plug with the optimized flow directing surface shape. Such an optimization method is typically performed as a computer-implemented method including an optimization algorithm.

Such optimization algorithms are well known and can for example be implemented by applying gradient descent on the pressure drop as cost function. In such method numerical derivatives are calculated while the fluid directing surface shape of the releasable plug is varied, wherein the variation process in continued to follow the gradient descent until a minimal pressure drop has been found for the optimized flow directing surface shape. Since such optimization algorithms are well known, no further details are described herein.

According to one or more embodiments, the step of forming an adapted releasable plug with an optimized flow direction surface shape is performed by a molding process, optionally by injection molding of a reactive mixture of polymer precursors. Alternatively, the adapted releasable plug can be formed by an additive manufacturing process, such as 3D printing, or by a material removing process.

According to one or more embodiments, the method for adapting a flow distributor unit does not perform a flow simulation base optimization algorithm to determine an optimized fluid directing surface shape for the adapted releasable plug, but uses a set of releasable plugs including releasable plugs with the variety of flow directing surface shapes which are then subsequently inserted into the opening of the flow conduit for measuring the resulting pressure drop. Eventually, the releasable plug that generates the lowest pressure drop in the flow distributor unit is selected as the adapted releasable plug, which is then finally inserted into the opening of the flow conduit to obtain the adapted flow distributor unit.

According to one or more embodiments, a fluid distribution kit is provided which includes a fluid distributor unit and a set of exchange releasable plugs including releasable plugs with the variety of different flow directing surface shapes.

DETAILED DESCRIPTION

Figure 1:
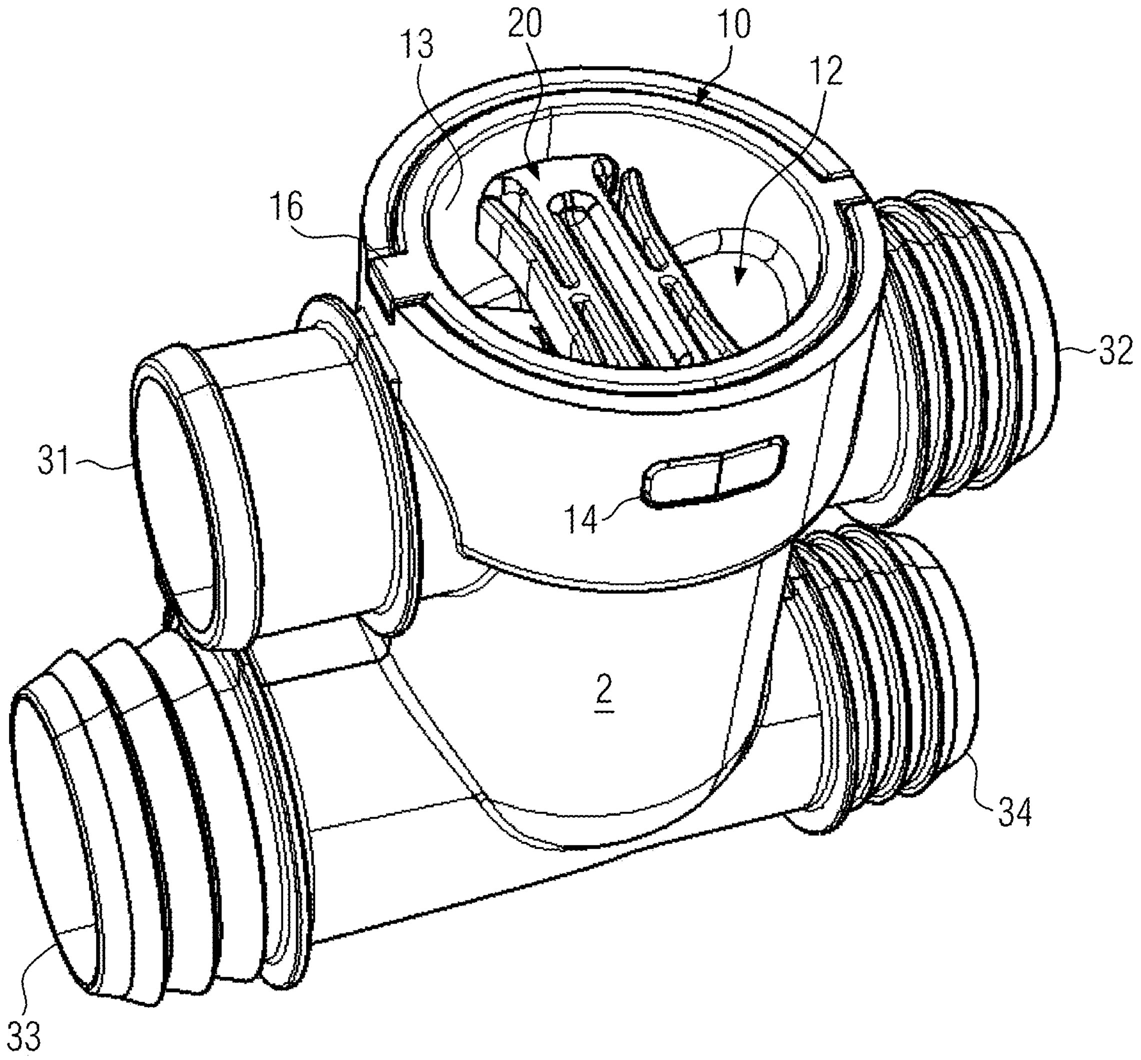
FIG. 1 shows a perspective view of a flow distributor unit including four transverse ports.

A first embodiment of a flow distributor unit will be described with reference to FIGS. 1-4. The flow distributor unit shown in FIGS. 1 and 2 comprises a flow conduit 2 with a connecting passage 4 (FIG. 2) extending therethrough in a longitudinal direction. Four ports 31-34 are merging into the flow conduit 2 and are in fluid communication with the connecting passage 4 (FIG. 2). The four ports 31-34 extend transversely to the connecting passage 4. At one end the connecting passage 4 is open (see FIG. 2), thereby forming an opening 8 in the flow conduit 2.

The opening 8 in the flow conduit 2 is closed by a releasable plug 10 which is inserted into the opening and fixed in place. The cup-shaped releasable plug 10 has a recess 12 in its outer surface and a surrounding upstanding outer rim 13. In the outer rim 13 of the releasable plug 10 two holes 14 are formed which are located diametrically opposite to each other. The holes 14 in the outer rim 13 of the releasable plug correspond to diametrically opposite holes 6 which are located in the outer wall of the flow conduit 2 surrounding the opening 8, and which are located with respect to the holes 14 in the releasable plug 10 such that the holes 8, 14 are aligned and congruent when the releasable plug 10 is rotationally correctly aligned and positioned in the opening 8 of flow conduit 4. The correct rotational positioning of the releasable plug 10 with respect to the opening 8 is ensured by diametrically opposite tongues 16 extending outwardly from the upper end of the outer rim 13 of the releasable plug 10, wherein the opening 8 of the flow conduit 2 is provided with two complementary recesses configured to receive the tongues 16 when the releasable plug 10 is rotationally correctly positioned. In principle, a single tongue 16 and a single cooperating recess are sufficient to achieve the correct rotational positioning.

Figure 2:
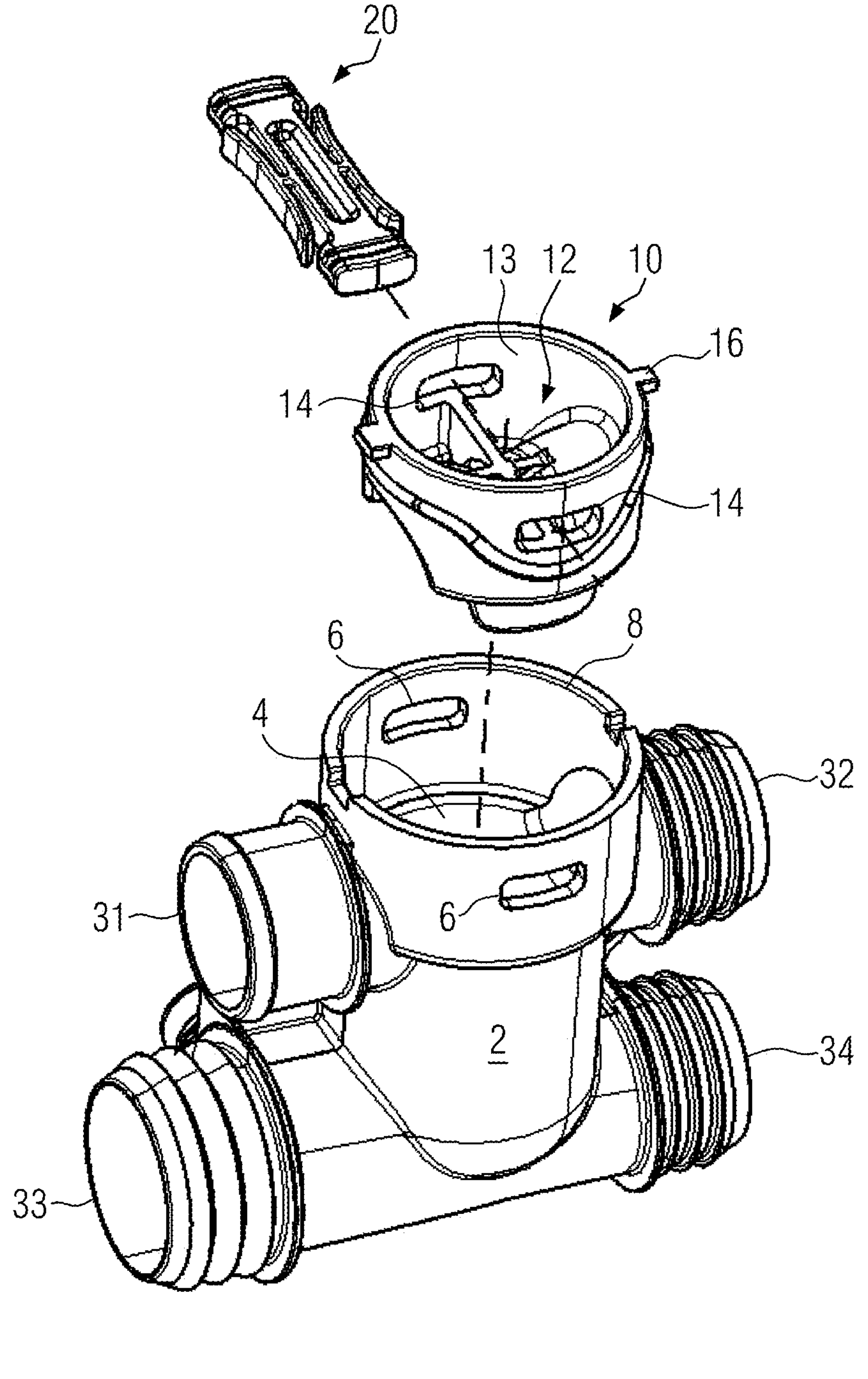
FIG. 2 shows an exploded view of the flow distributor unit of FIG. 1.

In FIG. 1 a locking element 20 is shown in a locking position holding the releasable plug 10 locked in place in the opening 8 of the flow conduit 2. The locking element 20 comprises an elongated bar 22 (see FIG. 3), wherein the length of the elongated bar 22 and the shape of its opposite end portions are adapted to the positioning and shape of the holes 14 in the releasable plug 12 and the holes 8 in the outer wall of the flow conduit 2, such that the elongated bar 22 is in its locking position extending through an aligned pair of holes 6, 14 and further through the recess 12 and into an opposing pair of holes 6, 14 in the releasable plug 10 and the outer wall of the flow conduit 2, thereby locking the releasable plug 10 in the inserted position closing the opening 8 of the flow conduit 2.

Figure 3:
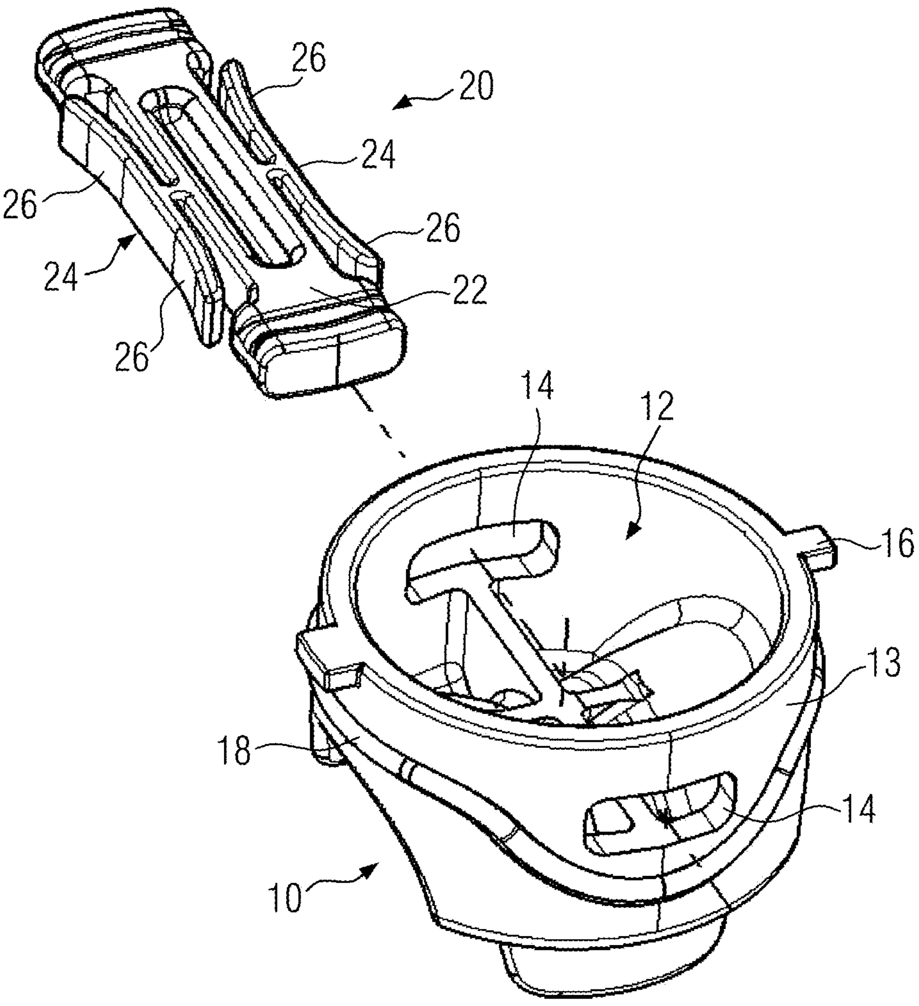
FIG. 3 shows an enlarged exploded view of a locking bar and a releasable plug of the flow distributor unit shown in FIGS. 1 and 2.

To hold the locking element 20 in place in the releasable plug 10 in the locking position, the locking element 20 comprises two locking arms 24 which are connected to the elongated bar 22 on opposite sides. Each locking arm 24 is connected in a central connecting region to the elongated bar 22. Furthermore, each locking arm 24 comprises oppositely extending self-supporting end portions 26 which are shown in FIG. 3 to be slightly curved away from the elongated bar 22 at their outer ends. The self-supporting end portions 26 are, in the direction of elongation of the elongated bar 22, less extensive or shorter than the elongated bar 22 so that the elongated bar 22 extends with its opposite end portion beyond the ends of the self-supporting portions 26 of the locking arms 24. In the locked state of the locking element 20 the opposite end portions of the elongated bar 22 extend beyond the ends of the self-supporting end portions 26 and are received in the opposing pair of aligned holes 14, 6 of the releasable plug 10 and the flow conduit 2. In this state the ends of the self-supporting end portions 26 of the locking arms 24 are in abutment on portions of the inner wall of the outer rim 13 of the releasable plug 10 adjacent to the holes 14, thereby preventing any movement of the locking element 20 in the direction of elongation of the elongated bar 22.

The locking arms are in the area of the self-supporting end portions 26 flexible and can be flexed from the rest position shown in FIG. 3 to an inwardly bent position by squeezing the ends of two opposite self-supporting portions 26 together between two fingers of a user, thereby urging the outer ends of the self-supporting end portions 26 towards elongated bar 22 which brings the ends of the self-supporting end portions 26 of the locking arm into the area of the openings 14 in the outer rim 13 of the releasable plug 10. In this condition the locking element 20, with the self-supporting end portions 26 of the locking arms at one end urged into the inwardly bent position, can be pushed through the hole 14 in the outer rim 13 of the releasable plug 12 and further through the aligned hole 6 in outer wall of the flow conduit 2 to thereby remove the locking element 20. In this unlocked state of the releasable plug 10 it can be pulled out of the opening 8 of the flow conduit 2.

In the embodiment of FIG. 3 the locking element 20 is integrally formed as a single piece with the elongated bar 22 and the locking arms 24 from the same material, for example formed of a plastic material by injection molding. The central elongated bar 22 is formed with the rather large width and thickness to provide a mechanical strength for holding the releasable plug 10 safely in the locked position in the opening 8 of the flow conduit 2 and for mechanically supporting the releasable plug 10 to withstand high forces due to high pressure with significant deformation of the releasable plug 10. The locking arms 24 extending from a central connection region from the elongated bar 22 are formed with a reduced width and thickness so that the locking arms 24 are substantially more flexible than the elongated bar 22 and can be squeezed, as described before, with two fingers to an inwardly bent position of the two opposite self-supporting portions 26. The cross-sectional size and shape of the elongated bar are chosen such that the elongated bar 22 can pass, with the self-supporting end portions 26 of the locking arms at the leading end urged into the inwardly bent position, pass through the hole 6 and of the flow conduit the hole 14 in the outer rim 13 of the releasable plug 10, without deforming the wall portions surrounding the holes 6 and 14.

Figure 4:
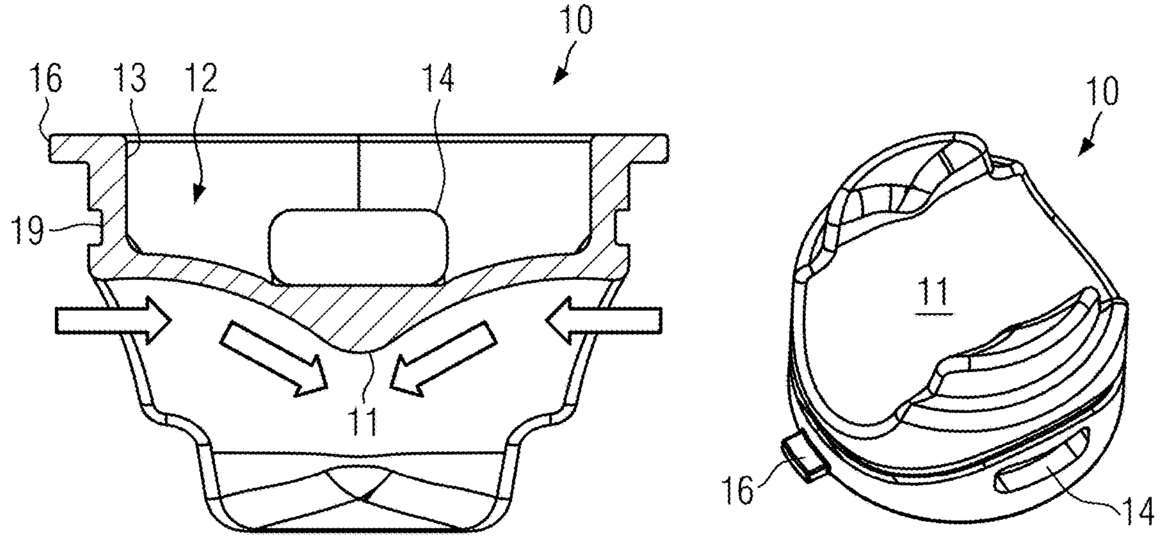
FIG. 4 shows a cross-sectional view of the releasable plug and a perspective view on a fluid directing surface shape of the releasable plug.

As can also be seen in FIG. 3 the outer wall of the outer rim 13 of the cup-shaped releasable plug 10 is provided with a sealing ring 18 which is received in a circumferential groove 19 in the outer wall of outer rim 13 (this groove 19 can for example be seen in FIG. 4).

Figure 9:
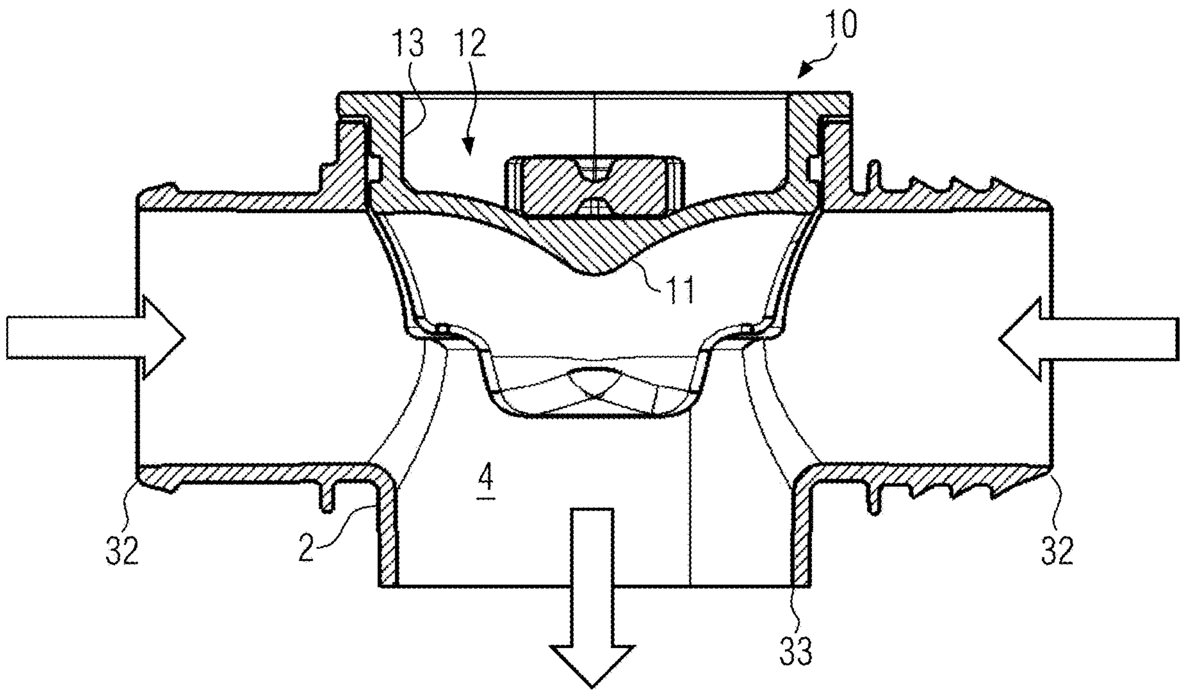
FIG. 9 shows a further embodiment of a flow distributor unit having two transverse ports and one longitudinally extending port.

FIG. 4 shows a cross-sectional view of the releasable plug 10 of the flow distributor unit of FIGS. 1-3. The inner surface of the cup-shaped releasable plug 10, wherein this inner surface is partially projecting into the connecting passage 4 of flow conduit 2, comprises a fluid directing surface shape 11 which rises from two opposite directions and forms a smoothly curved central ridge. The shape of the fluid directing surface shape 11 is also illustrated on the right-hand side of FIG. 4 in a perspective view on the inner surface side of the releasable plug 10 including the fluid directing surface shape 11. Such fluid directing surface shape 11 with a smoothly curved central ridge is suitable for a configuration in which two ports merged from opposite directions into flow conduit 2 (such as shown in FIG. 9). In FIG. 4 arrows indicate a fluid flow reaching from opposite directions the region of the connecting passage in which the fluid directing surface shape 11 partially projects into the connecting passage of flow conduit 2, wherein the oppositely directed flows are diverted and redirected by the fluid directing surface shape 11 to turn eventually by about 90° to the longitudinal direction of the connecting passage 4 of flow conduit 2 (see also FIG. 9) to flow towards the outlet port 33.

Figure 5:
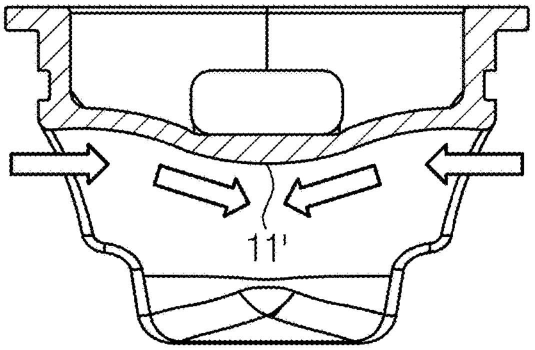
FIGS. 5 and 6 show cross-sectional views of the releasable plug with varied fluid direction surface shapes to direct fluid flow for varied flow patterns in a fluid distributor unit.
Figure 6:
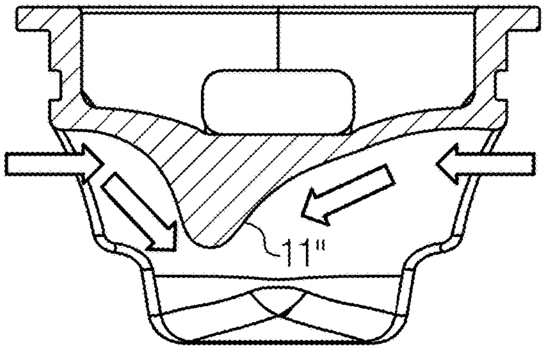

FIGS. 5 and 6 show cross-sectional views of embodiments of the releasable plug 10 with varied fluid directing surface shapes 11 which are adapted to other designs of the flow conduit or other configurations of inlet ports which result in varied flow rates of flows entering the flow conduit 2 and which therefore require a varied fluid directing surface shape 11 to achieve an optimized fluid flow which is characterized by a minimized pressure drop of the fluid flow through the flow distributor unit. If there are more than two input ports or more than two output ports there are pressure drop values for each pair of an input port and an output port, and in such cases the average of the pressure drop values is defined as the pressure drop over the flow distributor unit.

Figure 7:
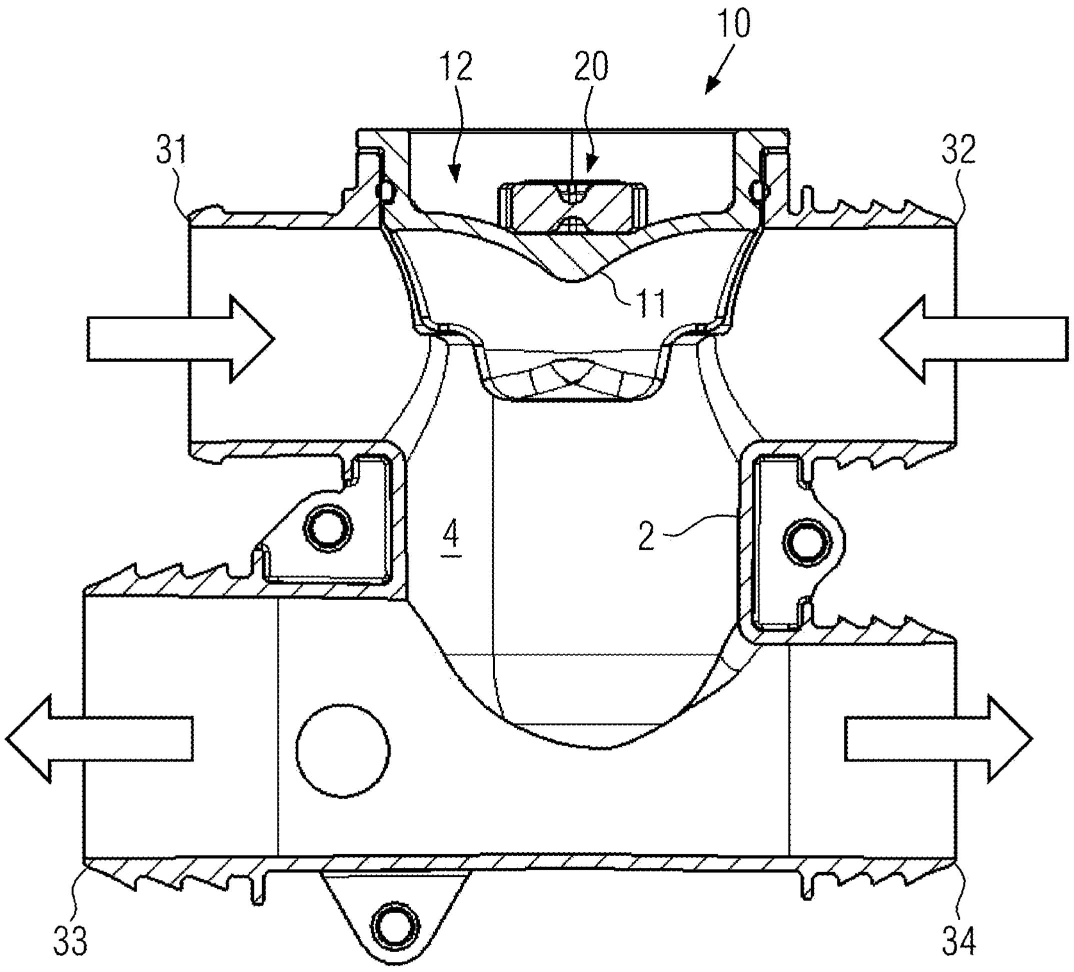
FIG. 7 shows a further embodiment of a fluid distributor unit with four transverse ports.

FIG. 7 is a cross-sectional view of a further embodiment of a fluid distributor unit. This fluid distributor unit comprises a flow conduit 2 surrounding a connecting passage 4 which extends in a longitudinal direction (in the vertical direction in FIG. 7). Two inlet ports 31, 32 merge into the flow conduit 2 close to the upper end of the flow conduit 2. Two outlet ports 33, 34 extend in opposite transverse directions from the flow conduit 2 close to its opposite end. Fluid flows enter from opposite directions through the inlet ports 31, 32, and fluid flow is smoothly and continuously diverted by the fluid directing surface shape 11 of the releasable plug 10 (such as illustrated in FIG. 4) to direct fluid flow to the longitudinal direction of the connecting passage 2 towards the outlet ports 33, 34. Outlet port 33 has a larger inner diameter than outlet port 34. For this reason, outlet port 33 has a lower flow resistance than outlet port 34, and the flow rate through the outlet port is larger than the flow rate through outlet port 34 (assuming that the tubes connected to outlet ports 33, 34 also have different inner diameters, with a larger diameter tube connected to outlet port 33 and a smaller inner diameter tube connected to outlet port 34).

Figure 8:
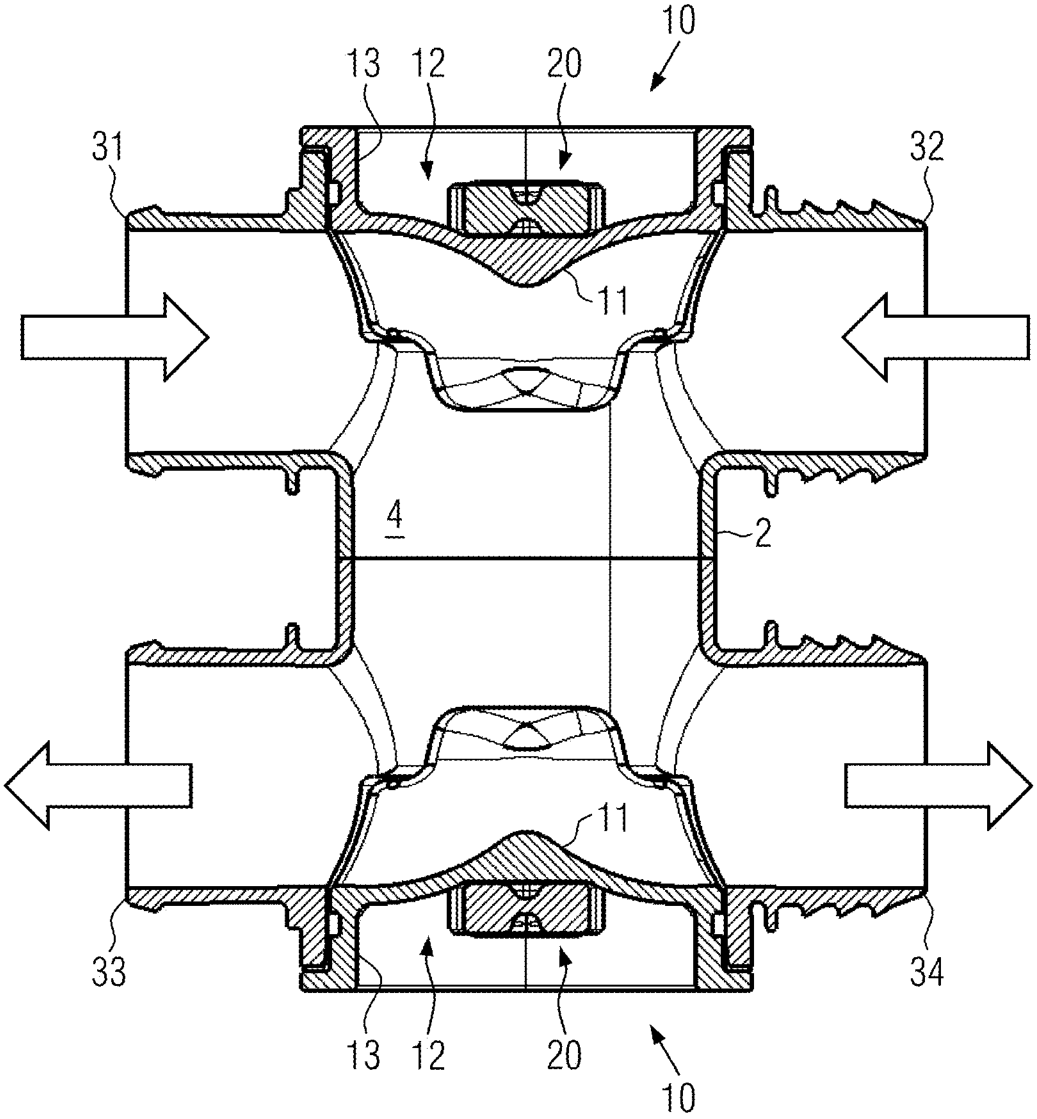
FIG. 8 shows another embodiment of a fluid distributor unit with four transverse ports.

FIG. 8 shows a cross-sectional view of a fluid distributor unit which is very similar to the one illustrated in FIG. 7. In particular, the flow distributor unit illustrated in FIG. 8 also has two oppositely directed inlet ports 31, 32 close one of the ends of the connecting passage 4 of the flow conduit 2. There are also two oppositely directed outlet ports 33, 34 close to the other end of the connecting passage 4 of flow conduit 2. In contrast to the design all illustrated in FIG. 7 the flow distributor unit shown in FIG. 8 is provided with a second releasable plug 10 such that there is also a releasable plug 10 inserted into an opening of the flow conduit 2 at the end of the connecting passage 4 close to the outlet ports 33, 34. The second releasable plug has the same fluid directing surface shape 11 as the releasable plug 10 closed to the inlet ports 31, 32. Whereas the fluid directing surface shape 11 of the releasable plug 10 close to the inlet ports 31, 32 assists in diverting the oppositely directed inlet flows to turn into the connecting passage 4 towards the end of the connecting passage 4 close to the outlet ports 33, 34, the fluid directing surface shape 11 of the releasable plug 10 at that end assists in diverting the fluid flow flowing in longitudinal direction (vertical direction in FIG. 8) through the connecting passage 4 to two oppositely directed fluid flow flowing in opposite transverse directions through the outlet ports 33, 34.

FIG. 9 is a cross-sectional view of a flow distributor unit in the form of a T-piece, here with two oppositely directed inlet ports 31, 32 and a common outlet port 33 which is directed perpendicular to the inlet ports 31, 32. The releasable plug 10 has an inner surface with a flow directing surface shape 11 as described before, namely with a central smoothly curve ridge which assists in diverting the incoming flows through inlet ports 31, 32 to flow towards outlet port 33. The releasable plug 10 with this fluid directing surface shape would also be suitable when all flow directions would be reversed, i.e. fluid directing surface shape 11 would assist in diverting and dividing an incoming flow through port 33 into two outgoing flows through ports 31, 32.

Figure 10:
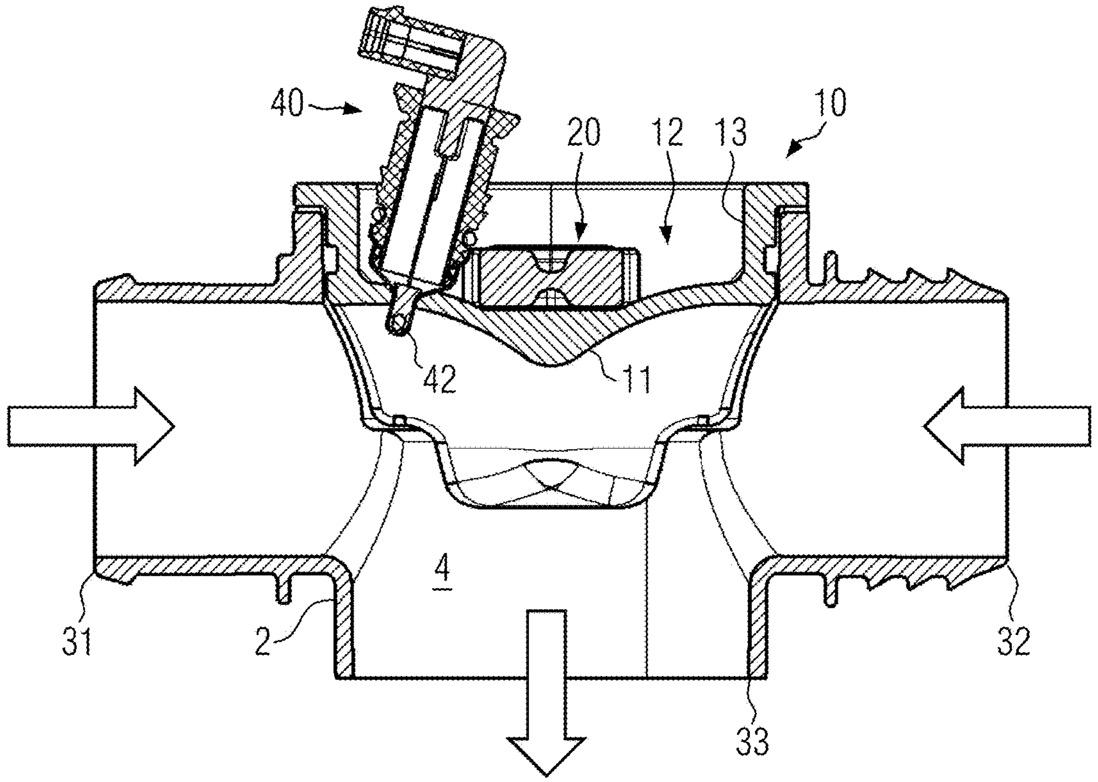
FIG. 10 shows the fluid distributor unit in FIG. 9 with a modified releasable plug including an aperture which allows to attach a sensor so that a tip portion of the sensor extends through aperture of the releasable plug.

FIG. 10 is a cross-sectional view of the same design of a fluid distributor unit as in FIG. 9, wherein in the case of FIG. 10 the fluid distributor unit is equipped with a sensor 40. The sensor 40 is attached to the releasable plug 10 by inserting a tip portion 42 of the sensor 40 into an aperture which extends through the wall of the releasable plug 10, namely from its outer surface at the bottom of the recess 12 to the inner surface which is exposed to the fluid flow in the fluid distributor unit. The end of the tip portion 42 comprises a sensitive area of the sensor 40, and in this manner the sensor 40 can measure physical parameters of the fluid flow in the flow distributor unit, for example the fluid temperature if the sensor 40 is a thermal sensor. Other possible types of sensors are a flow rate sensor, pressure sensor, etc.

Figure 11:
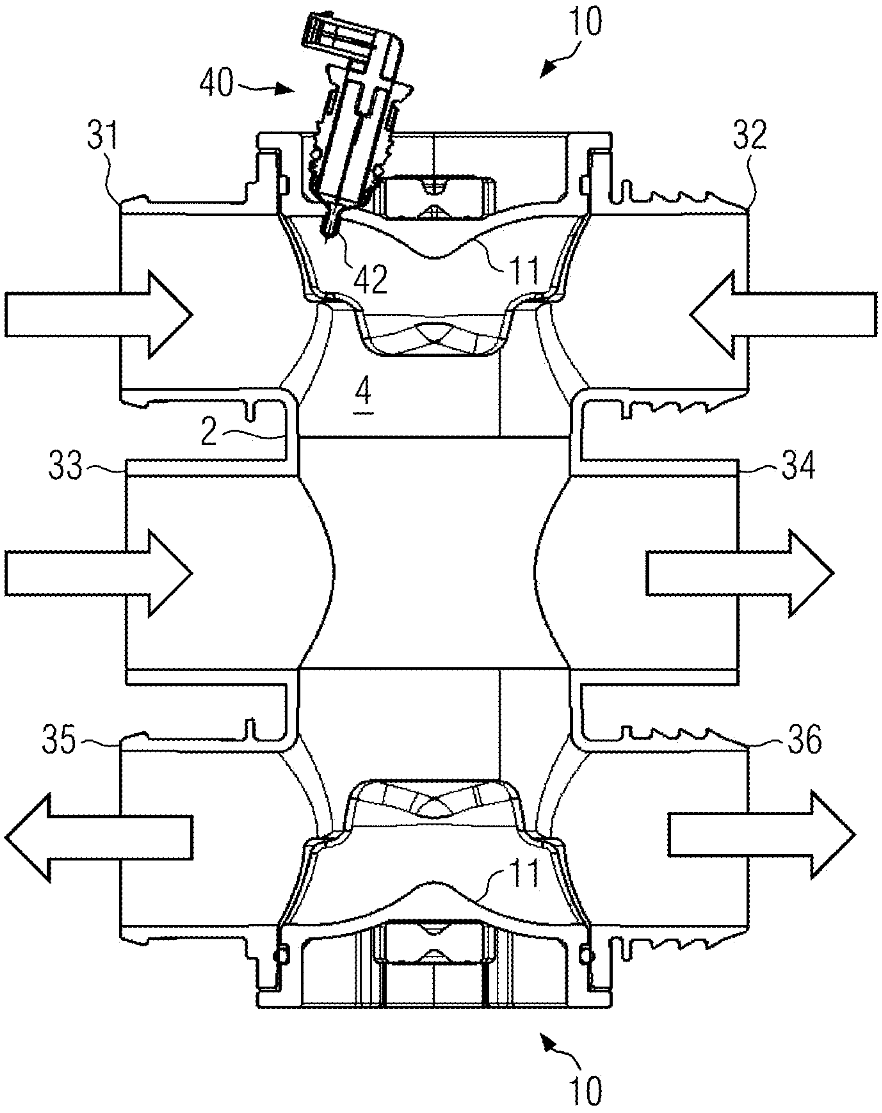
FIG. 11 shows still another embodiment of a flow distributor unit comprising six transverse ports, wherein one releasable plug is provided with an aperture and with an attached sensor extending with its tip portion through the aperture to the interior of the connection passageway in the flow distributor unit.

FIG. 11 is a further embodiment of a fluid distributor unit with three pairs of oppositely directed ports along the longitudinal direction of the connecting passage 4 of the flow conduit 2. The connecting passage 4 is open at both of its opposite ends with openings in the flow conduit 2 into which releasable plugs 10 are inserted and locked in place in the openings as described before. The fluid directing surface shape 11 of the two releasable plugs 10 has the same shape as before in FIGS. 4, 7-10. The releasable plugs 10 at the end close to the inlet ports 31, 32 is equipped with a sensor 40 as has been described above in connection with FIG. 10. The releasable plug 10 inserted into the opening of the flow conduit 2 at the opposite end close to outlet ports 35, 36 is of the same design, but has no throughgoing aperture and no sensor attached to it.

Figure 12:
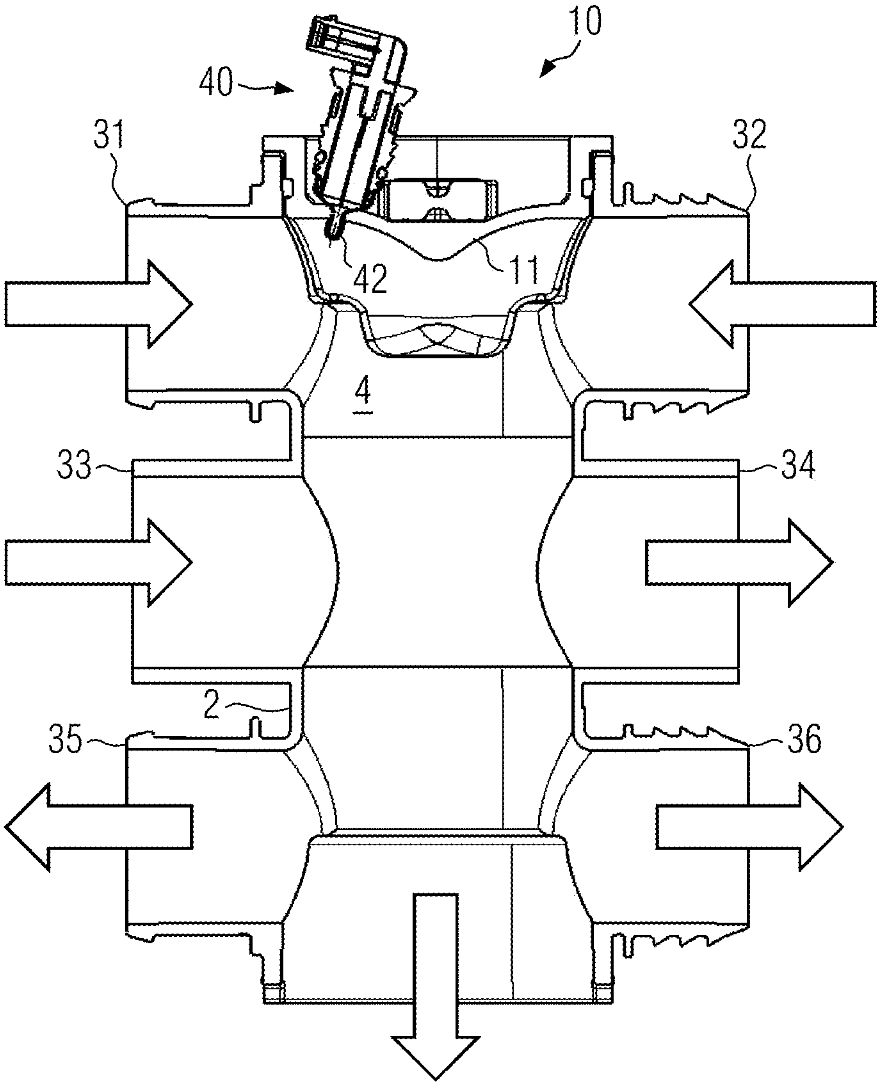
FIG. 12 shows a modified version of the embodiment of the fluid distributor unit of FIG. 11.

FIG. 12 is a cross-sectional view of a very similar flow distributor unit which differs from the one shown in FIG. 11 in that there is no releasable plug 10 in the opening of the flow conduit 2 opposite to opening into which the releasable plug 10 is inserted and locked. In the case of FIG. 12 the opening in the flow conduit 2 opposite to the opening with the inserted releasable plug 10 is not provided with a releasable plug and acts as a further port for fluid flow of the fluid distributor unit, in this case as an outlet port.

Figure 13:
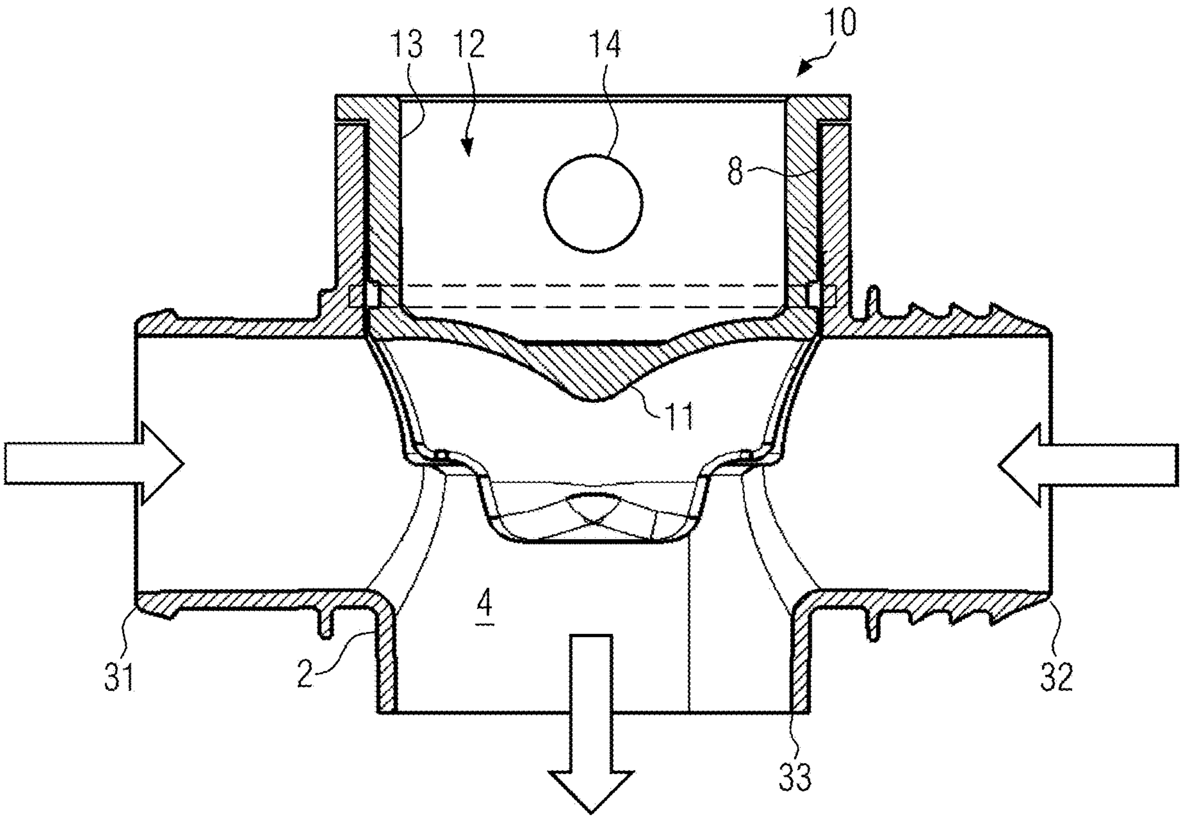
FIG. 13 shows an alternative embodiment of a flow distributor unit similar to the embodiment of FIG. 9.

FIG. 13 shows an alternative embodiment of the flow distributor unit in cross-section similar to the embodiment of FIG. 9, wherein in FIG. 13 the outer wall of the opening 8 has, compared to FIG. 9, an enlarged height, and the releasable plug 10 has an outer rim 13 of correspondingly enlarged height. In this design the locking element could be located further away from the bottom wall of the releasable plug which projects partially into the connection passage 4 of the flow conduit. Also indicated in FIG. 13 is an alternative shape and positioning of the sealing ring that is schematically shown in dashed lines, wherein the sealing ring has an annular shape and extends circumferentially in a groove formed in the outer wall of the rim 13 of the releasable plug 10.

In FIG. 13 also an alternative shape of the hole 14 in the outer rim 13 is illustrated as a circular hole (which could also be a square hole etc.). Such different shape of the hole 14 (and the hole 6) would also allow different shapes of the elongated bar 22 of the locking element, wherein the elongated bar could in case of FIG. 13 for example be of cylindrical shape. Alternative shapes of the elongated bar are of course possible, wherein the shapes of the holes 6 and 14 have to be adapted to the cross-sectional shape of the elongated bar.

The invention claimed is:

1. A fluid distributor unit comprising:

a flow conduit which surrounds a connecting passage extending in a longitudinal direction therethrough;

a releasable plug; and a releasable locking element, wherein the flow conduit comprises at least three ports in fluid communication with the connecting passage, wherein at least two of the ports extend transversely to the connecting passage from the flow conduit, wherein the flow conduit is open at one end of the connecting passage in the longitudinal direction so that the one end of the connecting passage forms an opening in the flow conduit, wherein the releasable plug is inserted into the opening of the flow conduit to close the opening, wherein the releasable plug has an inner surface with a smooth flow directing surface shape which at least partially projects into the connecting passage to direct fluid flow with reduced turbulence, wherein the releasable locking element is configured to engage with and extend through aligned holes in the releasable plug and in the flow conduit to thereby hold the releasable plug locked in place in the opening of the flow conduit, wherein the releasable plug is cup-shaped and has an outer surface opposite to the inner surface comprising a recess including an upstanding outer rim, wherein the outer rim has an outer diameter equal to an inner diameter of the connecting passage of the flow conduit, wherein the outer rim comprises two diametrically opposite holes, and wherein the flow conduit comprises, proximate to the opening, two diametrically opposite holes which are located in an outer wall of the flow conduit such that the holes in the outer wall are configured to be aligned with the holes of the outer rim of the releasable plug when the releasable plug is in an inserted position in the opening of the flow conduit.

2. The fluid distributor unit according to claim 1, wherein the flow conduit is an injection molded part.

3. The fluid distributor unit according to claim 1, wherein the outer rim of the cup-shaped releasable plug comprises at least one outwardly extending tongue, and wherein the opening of the flow conduit comprises a complementary shaped recess to receive the at least one tongue of the releasable plug when the releasable plug is rotationally positioned in the opening of the flow conduit with the holes of the outer rim of the releasable plug aligned with the holes in the outer wall of the flow conduit.

4. The fluid distributor unit according to claim 3, wherein the outer rim of the cup-shaped releasable plug comprises two outwardly extending tongues, and wherein the opening of the flow conduit comprises two complementary recesses to receive the tongues of the releasable plug when the releasable plug is rotationally positioned in the opening of the flow conduit with the holes of the outer rim of the releasable plug aligned with the holes in the outer wall of the flow conduit.

5. The fluid distributor unit according to claim 1, wherein the releasable locking element comprises an elongated bar which carries on opposite sides thereof two locking arms which are connected to the elongated bar at connection regions on opposite sides of the elongated bar, wherein each of the locking arms has a self-supporting end portion extending from the connection region towards one end of the elongated bar, wherein the self-supporting end portion of each of the locking arms is flexible and is configured to be flexed from a rest position to an inwardly bent position, wherein the dimensions of the holes in the outer rim of the releasable plug and in the outer wall of the flow conduit and the dimensions of the locking element are configured such that the locking element, with the self-supporting end portions of the locking arms urged to the inwardly bent position, is configured to be advanced through the holes of the outer rim and the outer wall of the flow conduit to move the locking element out of engagement with the releasable plug and the flow conduit to unlock the releasable plug, and wherein the self-supporting end portions of the locking arms in the rest position extend outwardly beyond the holes in the releasable plug such that the end portions of the locking arms are in abutment on an inner wall of the outer rim of the releasable plug, thereby keeping the locking element fixed in the locking position with the elongated bar extending through the opposite aligned holes in the outer rim of the releasable plug and of the outer wall of the flow conduit.

6. The fluid distributor unit according to claim 5, wherein the connection regions of the locking arms are located, in the direction of elongation of the elongated bar, at a central region of the elongated bar, and wherein each locking arm comprises two self-supporting end portions extending from the central connection region towards opposite ends of the elongated locking bar such that the locking element is removable from the locking position in fixed engagement in the releasable plug by squeezing the self-supporting end portions extending towards either of the two opposite ends of the locking element together to the inwardly bent position to allow to advance the locking element in the direction of the inwardly bent locking arms through the aligned holes of the releasable plug and the outer wall of the flow conduit so that the locking element is removable in either one of the two opposite directions from the locking position in the locked state in the releasable plug.

7. The fluid distributor unit according to claim 5, wherein the elongated bar and the locking arms of the locking element are integrally formed in one piece.

8. The fluid distributor unit according to claim 5, wherein the elongated bar and the locking arms of the locking element are formed from different materials and the locking arms are connected to the elongated bar.

9. The fluid distributor unit according to claim 1, wherein the releasable plug comprises a throughgoing aperture extending from an outer surface thereof to the inner surface, wherein the fluid distributor unit is provided with a sensor having a tip portion, and wherein the aperture is configured to receive the tip portion of the sensor such that a sensitive end of the tip portion of the sensor attached to the releasable plug is exposed to the fluid flowing through the flow distributor unit.

10. The fluid distributor unit according to claim 1, wherein the flow conduit comprises a second opening to the connecting passage, and wherein a second releasable plug is inserted into the second opening and is held locked in place by a second locking element, thereby exposing the smooth fluid directing surface shape to the fluid flow of the connecting passage.

11. The fluid distributor unit according to claim 1, wherein the upstanding outer rim of the releasable plug comprises at the outer wall a circumferential groove, and wherein a sealing ring is placed in the circumferential groove.

12. A method comprising:

adapting the fluid distributor unit according to claim 1 to a given type of fluid and to a predetermined pattern of flow rates through the ports of the fluid distributor unit, providing the releasable plug with the smooth flow directing surface shape adapted to the given type of fluid and the predetermined pattern of flow rates to cause a minimal pressure drop in the flow distributor unit, and inserting the releasable plug into the opening and bringing the locking element to the locking position holding the releasable plug locked in place in the opening of the flow conduit.

13. A fluid distribution kit comprising:

the fluid distributor unit according to claim 1; and a set of exchange releasable plugs including releasable plugs with different flow directing surface shapes relative to one another.

14. The fluid distributor unit of claim 4, wherein the two tongues are located diametrically opposite to each other and the two complementary recesses are located diametrically opposite to each other.

15. The fluid distributor unit of claim 7, wherein the locking element is made of a plastic material.

16. The fluid distributor unit of claim 8, wherein the locking element is made of a plastic material and the locking arms are made of metal.

17. A method for using a fluid distributor unit, the fluid distributor unit comprising:

a flow conduit which surrounds a connecting passage extending in a longitudinal direction therethrough;

a releasable plug; and a releasable locking element, wherein the flow conduit comprises at least three ports in fluid communication with the connecting passage, wherein at least two of the ports extend transversely to the connecting passage from the flow conduit, wherein the flow conduit is open at one end of the connecting passage in the longitudinal direction so that the one end of the connecting passage forms an opening in the flow conduit, wherein the releasable plug is inserted into the opening of the flow conduit to close the opening, wherein the releasable plug has an inner surface with a smooth flow directing surface shape which at least partially projects into the connecting passage to direct fluid flow with reduced turbulence, wherein the releasable locking element is configured to engage with and extend through aligned holes in the releasable plug and in the flow conduit to thereby hold the releasable plug locked in place in the opening of the flow conduit, wherein the method comprises:

adapting the fluid distributor unit to a given type of fluid and to a predetermined pattern of flow rates through the ports of the fluid distributor unit, providing the releasable plug with the flow directing surface shape adapted to the given type of fluid and the predetermined pattern of flow rates to cause a minimal pressure drop in the flow distributor unit, and inserting the releasable plug into the opening and bringing the locking element to the locking position holding the releasable plug locked in place in the opening of the flow conduit, and wherein the providing the releasable plug includes:

simulating the flow through the fluid distributor unit for the given type of fluid and the predetermined pattern of flow rates, varying the flow directing surface shape of the releasable plug and iteratively repeating the flow simulation to determine an optimized flow directing surface shape which minimizes the pressure drop in the fluid distributor unit, and forming the releasable plug with the optimized flow directing surface shape.

18. The method according to claim 17, the forming the releasable plug is performed by a molding process.

19. A method for using a fluid distributor unit, the fluid distributor unit comprising:

a flow conduit which surrounds a connecting passage extending in a longitudinal direction therethrough;

a releasable plug; and a releasable locking element, wherein the flow conduit comprises at least three ports in fluid communication with the connecting passage, wherein at least two of the ports extend transversely to the connecting passage from the flow conduit, wherein the flow conduit is open at one end of the connecting passage in the longitudinal direction so that the one end of the connecting passage forms an opening in the flow conduit, wherein the releasable plug is inserted into the opening of the flow conduit to close the opening, wherein the releasable plug has an inner surface with a smooth flow directing surface shape which at least partially projects into the connecting passage to direct fluid flow with reduced turbulence, wherein the releasable locking element is configured to engage with and extend through aligned holes in the releasable plug and in the flow conduit to thereby hold the releasable plug locked in place in the opening of the flow conduit, wherein the method comprises:

adapting the fluid distributor unit to a given type of fluid and to a predetermined pattern of flow rates through the ports of the fluid distributor unit, providing the releasable plug with the flow directing surface shape adapted to the given type of fluid and the predetermined pattern of flow rates to cause a minimal pressure drop in the flow distributor unit, and inserting the releasable plug into the opening and bringing the locking element to the locking position holding the releasable plug locked in place in the opening of the flow conduit, and wherein the providing the releasable plug includes:

providing a set of releasable plugs including releasable plugs with different flow directing surface shapes relative to one another, subsequently inserting the releasable plugs of the set and measuring the resulting pressure drop, and selecting the releasable plug that generates the lowest pressure drop in the flow distributor unit as the adapted releasable plug.

* * * * *